(12) United States Patent
Owada

(10) Patent No.: US 7,363,622 B2
(45) Date of Patent: Apr. 22, 2008

(54) REMOTE PROGRAM DOWNLOADING SYSTEM

(75) Inventor: Kiyoshi Owada, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1393 days.

(21) Appl. No.: 10/105,302

(22) Filed: Mar. 26, 2002

(65) Prior Publication Data

US 2002/0144254 A1 Oct. 3, 2002

(30) Foreign Application Priority Data

Mar. 30, 2001 (JP) .............................. 2001-098582

(51) Int. Cl.
*G06F 9/44* (2006.01)

(52) U.S. Cl. .......................... 717/168; 709/227; 710/1; 717/171

(58) Field of Classification Search ...................... None
See application file for complete search history.

(56) References Cited

U.S. PATENT DOCUMENTS

| | | | |
|---|---|---|---|
| 4,809,170 A | 2/1989 | Leblang et al. | |
| 5,450,589 A * | 9/1995 | Maebayashi et al. | 717/170 |
| 5,481,713 A | 1/1996 | Wetmore et al. | |
| 5,790,860 A | 8/1998 | Wetmore et al. | |
| 6,230,316 B1 | 5/2001 | Nachenberg | |
| 2002/0078209 A1 * | 6/2002 | Peng | 709/227 |

FOREIGN PATENT DOCUMENTS

| | | |
|---|---|---|
| EP | 0833246 | 4/1998 |
| EP | 0833246 A2 * | 4/1998 |
| JP | 11102287 | 4/1999 |
| JP | 2000-330779 | 11/2000 |
| WO | 99/54816 | 10/1999 |
| WO | WO99/54816 * | 10/1999 |

OTHER PUBLICATIONS

Levine, "Linkers and Loaders: Advanced Techniques," pp. 1-6 (Jun. 4, 1999), XP002368775, retrieved from the Internet at www.iecc.com/linker/linker11.html.
English Language abstract of JP 2000-330779.
English Language Abstract of JP 11-102287.

* cited by examiner

*Primary Examiner*—Wei Zhen
*Assistant Examiner*—Phillip H Nguyen
(74) *Attorney, Agent, or Firm*—Greenblum & Bernstein, P.L.C.

(57) ABSTRACT

In this system, program data is generated by configuring a plurality of modules based on a relationship between dependence of the modules composing the program. Then, generated two versions of program data is compared starting from a head address of each of the program data, and data at an address, and thereafter, where the data first makes a difference is extracted to generate difference data. Further, a center holds the latest version of program and at least one item of difference data, and transmits the whole data of program or difference data corresponding to a program version in a terminal apparatus, and the program is updated in the terminal apparatus using the received data.

6 Claims, 7 Drawing Sheets

| RANK | MODULE NAME |
|---|---|
| 1 | BOOT MODULE |
| 2 | OS MODULE |
| 3 | GRAPHIC MODULE |
| 4 | APPLICATION MODULE |

300

REMOTE PROGRAM DOWNLOADING SYSTEM

BACKGROUND OF THE INVENTION

1. Field of the Invention

The present invention relates to a remote program downloading system for remotely rewriting software installed into an apparatus connected to a network via a digital transmission path.

2. Description of the Related Art

In order to achieve a digital broadcast, notably digital satellite broadcast, digital broadcast receivers have been developed. In the digital broadcast receivers, software is executed therein to perform computer-related processing such as processing on digital video speech signals and display of electronic program guide corresponding to program schedule data.

In the digital broadcast, since broadcast contents are digitized, all data for use by computer is capable of being transmitted in addition to broadcast contents. Therefore, digital broadcast receivers are capable of receiving new software to be installed thereinto via broadcasts, and of substituting the new software for software currently executed therein. Such functions enable software of a digital broadcast receiver to be rewritten with the receiver lying in a house.

As such a remote downloading method via a broadcast, some methods have been proposed. For example, Japanese Laid-Open Patent Publication HEI11-102287 explains the remote downloading with attention principally focused on management of version.

Recently the provision of services has been considered such as online shopping and communication by e-mail with a digital broadcast receiver connected to a computer network via telephone lines and with the digital broadcast receiver used as a user interface. In other words, the digital broadcast receiver is going to be provided with not only current one-way service aspects for receiving broadcasts but also bi-directional service aspects as a telephone.

A remote downloading method via a bi-directional communication system is developed as a bank online system. For example, Japanese Laid-Open Patent Publication 2000-330779 proposes a patch method for downloading only an updated portion to reduce a communication time in a bank online system.

However, in the case of apparatuses, such as a digital broadcast receiver, mainly used in a house, the situation is different from that of the online system where an administrator of each terminal maintains close contact with the center, and cases occur frequently where power is not supplied to the digital broadcast receiver or the receiver is not connected to a communication channel at the time of remote downloading. Therefore, a large number of versions of current software exist which are executed in digital broadcast receivers targeted for remote downloading, resulting in a problem that there are enormous pieces of patch information to be managed on the center side.

SUAMMARY OF THE INVENTION

It is an object of the present invention to provide an information processing apparatus, center apparatus, terminal apparatus and remote program downloading system capable of reducing information amounts of patch information to be managed on the center side and of shortening a communication time with all terminals.

In the present invention, program data is generated by configuring a plurality of modules based on a relationship between the dependence of the modules composing the program.

Further in the present invention, generated two versions of program data is compared with each other starting from a head address of each program data, and data at an address, and thereafter, where the data first makes a difference between the two versions is extracted from a new version of program to generate difference data.

Furthermore in the present invention, the center stores the whole data of the latest version of program and at least one item of difference data, and transmits the whole data of program or difference data corresponding to a program version in a terminal apparatus, and using the received data, the terminal apparatus updates the program.

A first aspect of the present invention provides an information processing apparatus, as an apparatus for generating a program with a plurality of software modules linked statically, which is provided with a configuration designating section that designates a configuring order of software modules based on a relationship between the dependence of the software modules, and a program link section that configures each of the software modules according to the designated configuring order.

Thus, since the configuring order of software modules is determined based on the relationship between the dependence of the software modules, it is possible to suppress an effect imposed on the whole to a minimum even when part of software modules is changed due to the update.

A second aspect of the present invention provides an apparatus that designates a rank of each of software modules to configure in ascending order of dependence on the software modules.

In this way, since modules are configured in ascending order of dependence on the other modules, it is possible to concentrate change portions of program data on the latter part of the program data, and to decrease a size of the change portions.

A third aspect of the present invention provides an apparatus provided with a comparing section that compares program data of two versions, i.e., new one and old one, according to address, and an extracting section which based on the comparison result, detects an address where contents first make a difference, and extracts program data at the detected address and thereafter from program data of new version as difference data.

It is thereby possible to generate the data of small size for updating the program with less procedures.

A fourth aspect of the present invention provides a center apparatus provided with a data holding section that holds the latest version of program generated as described above and difference data, extracted as described above, of program of a particular version, a version acquiring section that acquires version information of the program from a terminal apparatus, a data selecting section that selects the difference data of the program when the acquired version information is coincident with a version in the program that is a source of the difference data held in the data holding section, while selecting the latest version of program when the version information is not coincident with any version, and a data transmitting section that transmits the selected difference data or the latest version of program to the terminal apparatus.

According to thus configured center apparatus, the difference data is transmitted to a communication terminal when the version in the terminal apparatus is coincident with a version in the program that is a source of the difference data held in the data holding section, while the latest version of program is transmitted to the terminal apparatus when the version in the terminal is not coincident with any version in the data holding section, and it is thereby possible to shorten a communication time required for the downloading as compared to the case of always transmitting the whole of the latest version of program to the terminal apparatus. Further, since the center apparatus holds the difference data corresponding to particular versions and transmits the whole of the latest version of program except the particular versions, it is possible to suppress the number of items of difference data to be held in the center apparatus. In particular, holding the difference data of versions downloaded in a large number of terminal apparatuses greatly suppresses the number of items of difference data to be held in the center apparatus.

In a fifth aspect of the present invention, when the data selecting section selects the difference data, the data transmitting section transmits, with the difference data, an address where contents first make a difference when the program data of two versions, i.e., new one and old one, is compared, while transmitting, with the latest version of program, a head address of the latest version of program when the data selecting section selects the latest version of program.

In this way, in either case of downloading the whole program or of downloading the difference data, since it is only required for the terminal apparatus to update data at the notified address and thereafter, it is possible to update the program in the same way as updating only the difference data when the whole program is downloaded, and to simplify the updating processing in the terminal apparatus.

A sixth aspect of the present invention provides a terminal apparatus provided with a data holding section that stores a program, and a data holding section updating section which using difference data obtained by extracting, from latest program data, program data at an address, and thereafter, where contents first make a difference between the latest program data and program data of a version stored in the data holding section, updates portions at the address and thereafter of the program stored in the data holding section.

According to thus configured terminal apparatus, since the update is performed with the difference data instead of always updating the whole program, it is possible to shorten a communication terminal required for downloading a program.

A seventh aspect of the present invention provides an apparatus in which the data holding section is a flash ROM, and which, when an address that causes a first difference in contents between the old version of program and the new version of program is within a sector in the flash ROM, updates the sector with program data of addresses up to the address stored in the flash ROM and with the difference data of the program.

In this way, when using a flash ROM as a storage medium for a program, it is possible to update on a sector-by-sector basis the flash ROM which writes and reads data on a sector-by-sector basis, independently of position to start updating the program.

An eighth aspect of the present invention provides an apparatus that receives an address that is a position to start updating a program stored in the data holding section, with the latest program data or difference data, transmitted from a center apparatus.

Thus, since the terminal apparatus updates the program data starting from the notified address even when the apparatus updates the whole program to the latest program data, it is possible to update the whole program in the same way as updating only the difference data, and to simplify the updating procedures in the terminal apparatus.

A ninth aspect of the present invention provides a remote program downloading system enabling the latest version of program or difference data to be downloaded from the center apparatus to the terminal apparatus.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described specifically below with reference to accompanying drawings.

Figure 1:
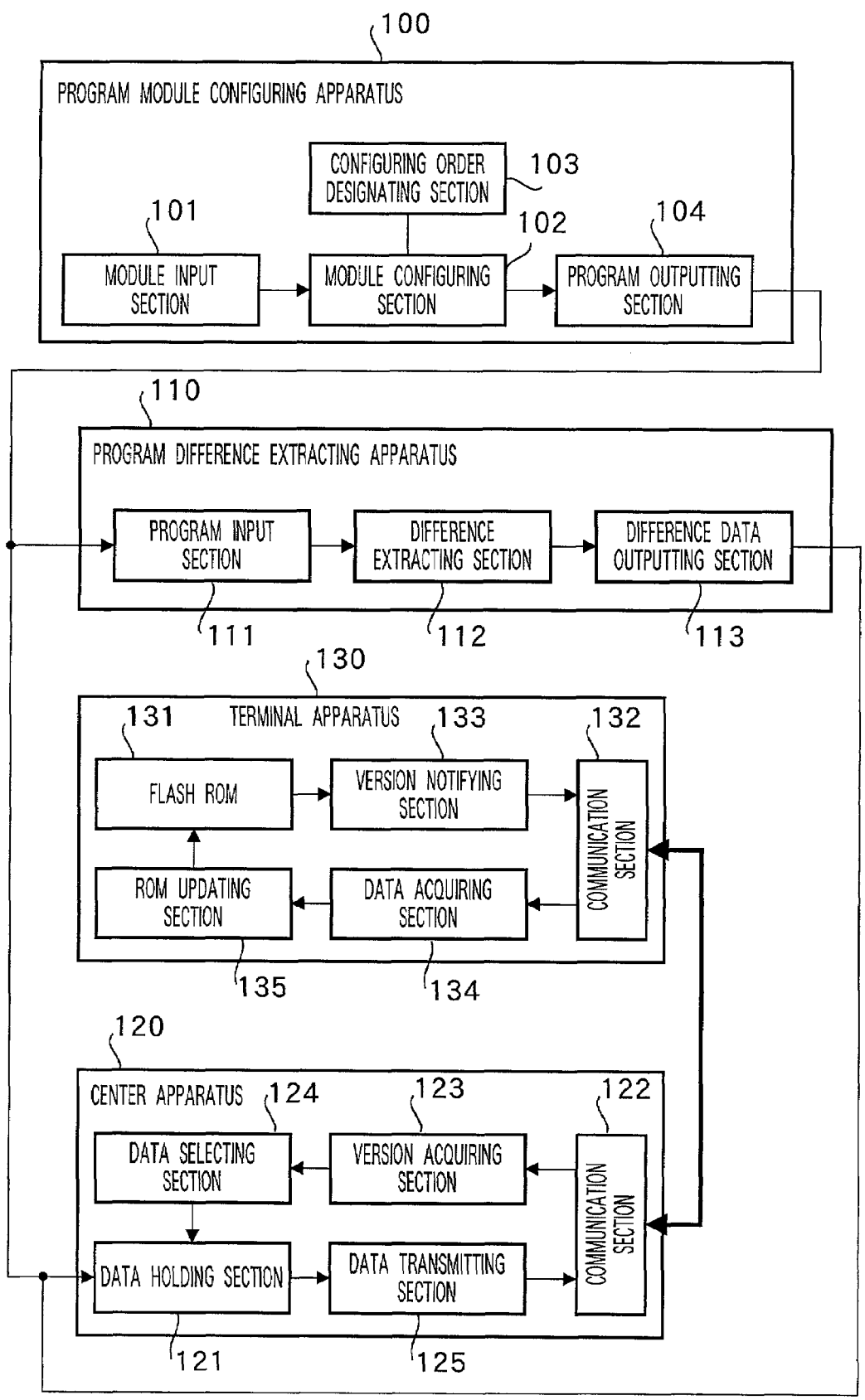
FIG. 1 is a diagram of an entire configuration of a remote program downloading system according one embodiment of the present invention.

FIG. 1 is a diagram illustrating an entire configuration of a remote program downloading system according one embodiment of the present invention. The remote program downloading system according this embodiment is comprised of program module configuring apparatus 100, program difference extracting apparatus 110, center apparatus 120 and terminal apparatus 130. The system may have one or more additional structure elements or eliminate either of structure elements without departing from the subject matter of the present invention.

Program module configuring apparatus 100 is comprised of module input section 101, module configuring section 102, configuring order designating section 103 and program outputting section 104. Module input section 101 receives a module from outside. Module configuring section 102 stores a module provided from module input section 101 at a predetermined address in memory space based on configuring order information obtained from configuring order designating section 103 to configure a complete program. Configuring order designating section 103 holds information on module configuring order determined based on a relationship between dependence of modules. Program outputting section 104 provides the program completed in module configuring section 102 to terminal apparatus 103 and program difference extracting apparatus 110. The program is provided to terminal apparatus 130 as initial program data, while being provided to program difference extracting apparatus 110 as program data for update for terminal apparatus 130.

Program difference extracting apparatus 110 is comprised of program input section 111, difference extracting section 112, and difference data outputting section 113. Program input section 111 receives two programs of old and new versions input from program module configuring apparatus 100. Difference extracting section 112 generates difference data between the two programs of old and new versions received in program input section 111. Difference data outputting section 113 outputs the difference data to center apparatus 120.

Center apparatus 120 is comprised of data holding section 121, communication section 122, version acquiring section 123, data selecting section 124 and data transmitting section 125. Data holding section 121 holds the program data generated in program module configuring apparatus 100, and a plurality of items of difference data generated in program difference extracting apparatus 110. Communication section 122 communicates with terminal apparatus 130 according to predetermined protocol. Version acquiring section 123 acquires version information of program data currently operating from communication terminal 130 via communication section 122. Data selecting section 124 selects one of the plurality of items of data held in data holding section 121, corresponding to the version in terminal apparatus 130 acquired in version acquiring section 123. Data transmitting section 125 fetches the data selected in data selecting section 124 from data holding section 121, and transmits the data to terminal apparatus 130 via communication section 122.

Communication terminal 130 is comprised of flash ROM 131, communication section 132, version notifying section 133, data acquiring section 134, and ROM updating section 135. Flash ROM 131 is a nonvolatile memory for storing the program data generated in program module configuring apparatus 100. Communication section 132 communicates with center apparatus 120 according to predetermined protocol. Version notifying section 133 notifies center apparatus 120 of a version of a current program by communications with center apparatus 120 via communication section 132. Data acquiring section 134 performs the processing for acquiring the data from center apparatus 120 via communication section 132. Flash ROM updating section 135 performs the processing for updating flash ROM 131 based on the data acquired in data acquiring section 134.

In addition, while a single terminal apparatus 130 is shown in FIG. 1, the present invention enables the system to cope with a plurality of terminal apparatuses 130, and each of the terminal apparatuses is connected with center apparatus 120 via communication channels such as telephone lines.

The operation in the remote program downloading system according to this embodiment will be described next. Program module configuring apparatus 100 will be described first with reference to FIGS. 1 to 5.

Figures 2, 3:
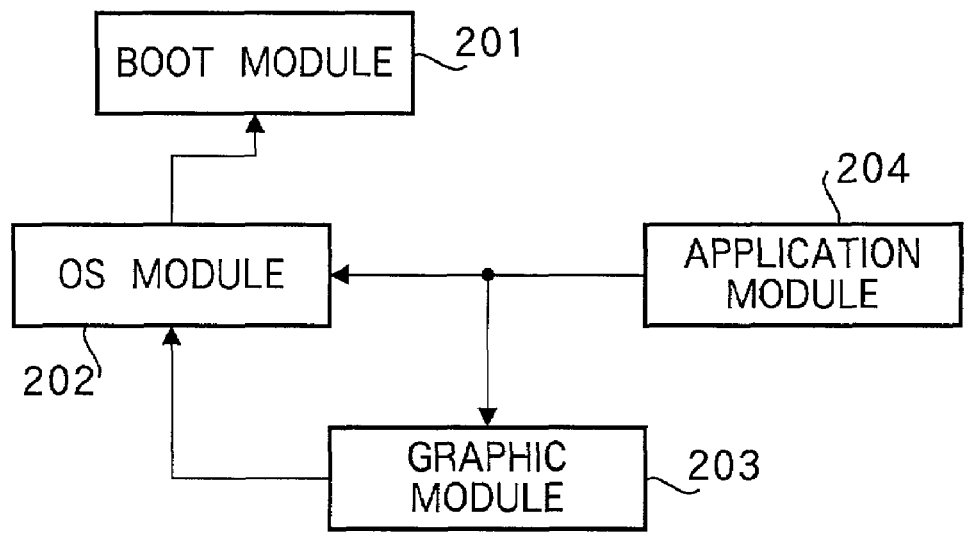
FIG. 2 is a correlation diagram of dependence of modules of a program.
FIG. 3 is a diagram illustrating module configuring order information held in a configuring order designating section in the above embodiment.

FIG. 2 is a correlation diagram indicative of a relationship between dependence of modules of a program that program module configuring apparatus 100 handles. The dependence of modules indicates a call of a function and a reference of a variable. Specifically, when module A calls a function in module B or refers to a variable in module B, it is expressed that module A is dependent on module B.

According to FIG. 2, boot module 201 is not dependent on any module, and OS module 202 is dependent on boot module 201. Graphic module 203 is dependent on OS module 202. Application module 204 is dependent on OS module 202 and graphic module 203.

FIG. 3 shows configuring order designating information 300 generated based on the relationship between the dependence of modules in FIG. 2. The configuring order illustrated in FIG. 3 is determined according to the relationship between the dependence of the modules illustrated in FIG. 2. Configuring order designating section 103 holds configuring order designating information 300 determined based on the relationship between the dependence of modules.

Figure 4:
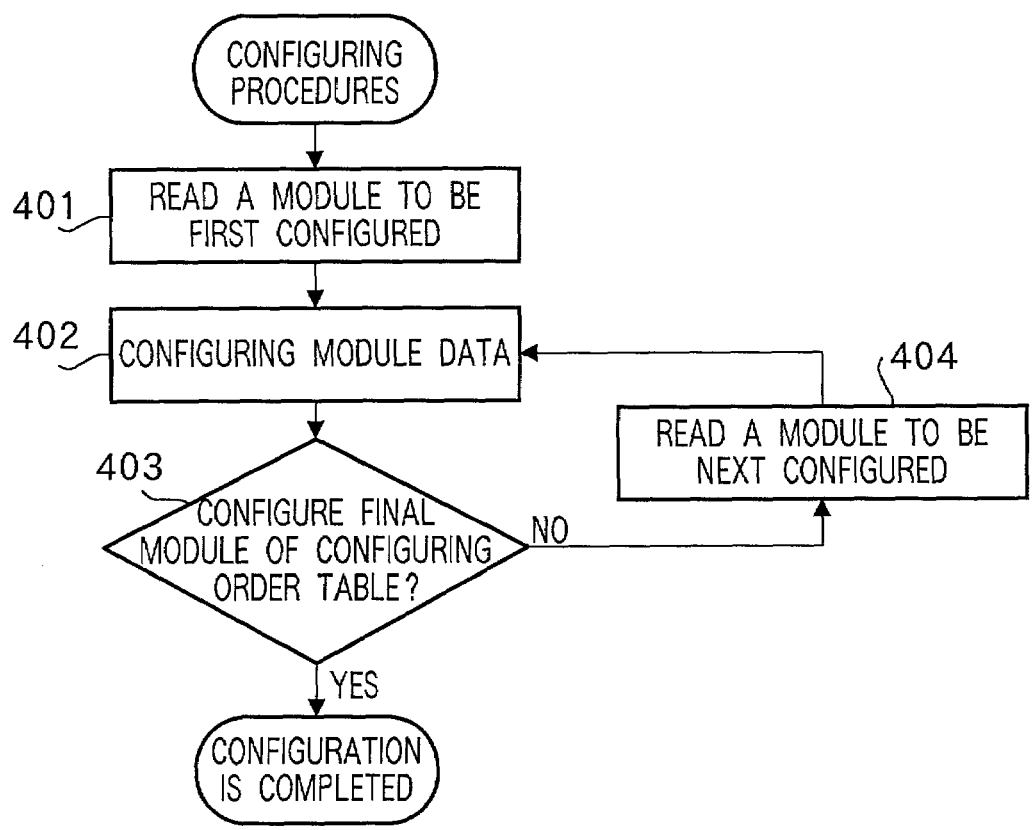
FIG. 4 is a flow diagram of program module configuring procedures in a program module configuring apparatus in the above embodiment.
Figure 5:
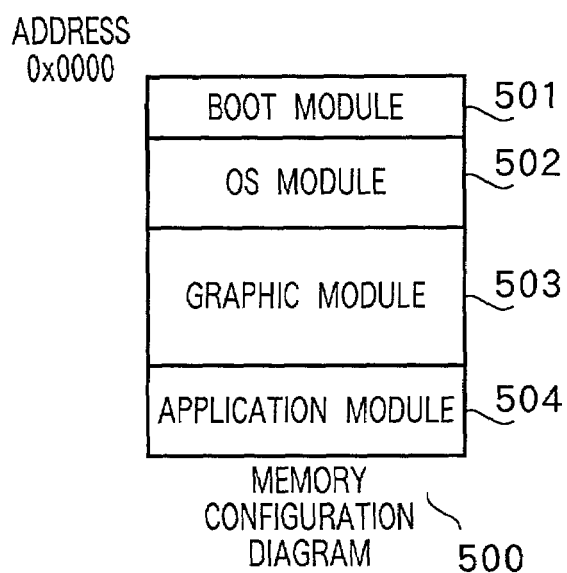
FIG. 5 is a program configuration diagram in a module configuring section in the above embodiment.

The operation in program module configuring apparatus 100 will be described below. FIG. 4 is a flowchart showing configuration procedures of a program in module configuring section 102. FIG. 5 is a configuration diagram of a program generated in program module configuring apparatus 100.

In step 401, module configuring section 102 recognizes boot module 201 (first-ranked) designated to be configured at a head portion in configuring the program modules, according to configuring order information (configuring order table) 300 in configuring order designating section 103, and reads boot module 201 from module input section 101.

In step 402, the section 102 configures the module data read in step 401 so that first data of the module data is stored at a head address in a memory space for program configuration.

In step 403, the section 102 determines whether the target module reaches the final one in configuring order information (configuring order table) 300. When the target module reaches the final one in configuring order information 300, the configuration is completed. When the target module does no reach the final one in configuring order information 300, the processing flow proceeds to step 404.

In step 404, the section 102 refers to configuring order information 300 to specify a module to be configured next, and reads the module data from module input section 101 to shift to the processing in step 402. In step 402, the section 102 configures the module read this time so that first data of the module is stored at an address following the final address of the module last configured.

The processing of steps 402 to 404 is repeated until a target module reaches final one in configuring order information 300, and when the final module (fourth-ranked) in configuring order information 300 is obtained, the configuration is completed.

Generally, when a change occurs in some module assembled into a program, addresses of a function and variable referred to in the module are changed. As a result, changes should be required in portions for referring to the function and variable in another module dependent on the some module. Further, in a program with static link, since a change in a module configured at a former portion requires changes in addresses of successive modules, a change at a latter portion as possible decreases a changing portion in the entire program data.

According to this embodiment, modules are configured in ascending order of dependence on other modules, and it is thereby possible to concentrate changing portions in program data on latter portions of the program data, and to decrease a size of changing portions.

Program module configuring apparatus 100 outputs thus generated new program to program difference extracting apparatus 110, or outputs the new program and old program to program difference extracting apparatus 110. When only the new program is output, it is assumed that program difference extracting apparatus 110 holds the old program.

Figures 6, 7:
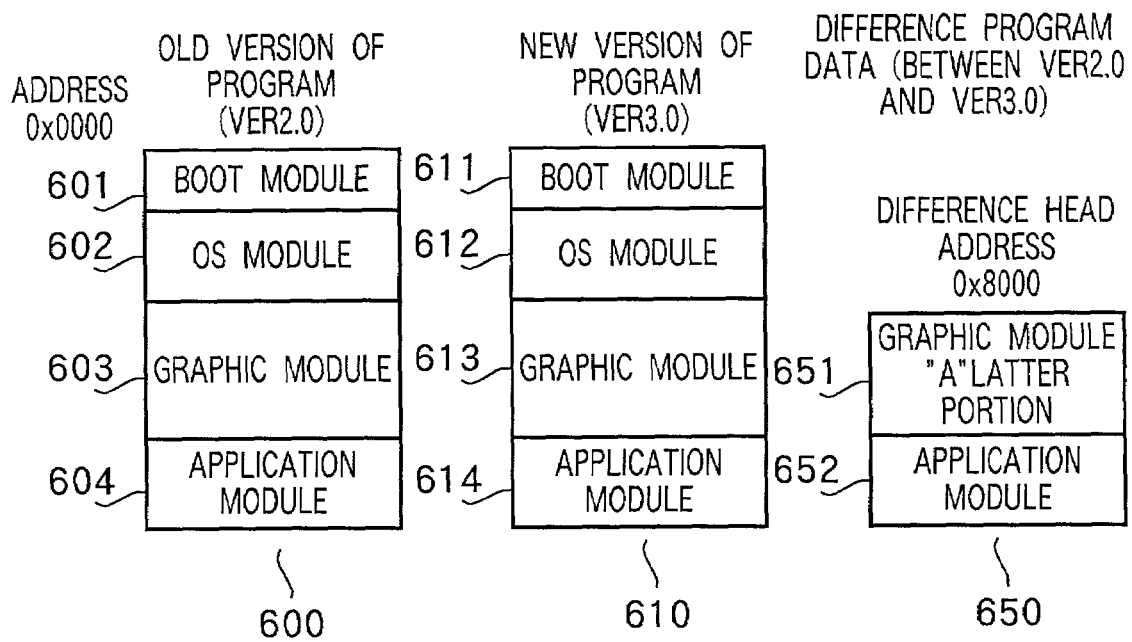
FIG. 6 illustrates configuration diagrams of old and new versions of programs and a configuration diagram of difference data in a program difference extracting apparatus in the above embodiment.
FIG. 7 is a data configuration diagram of information stored in a data holding section in a center apparatus in the above embodiment.
Figure 8:
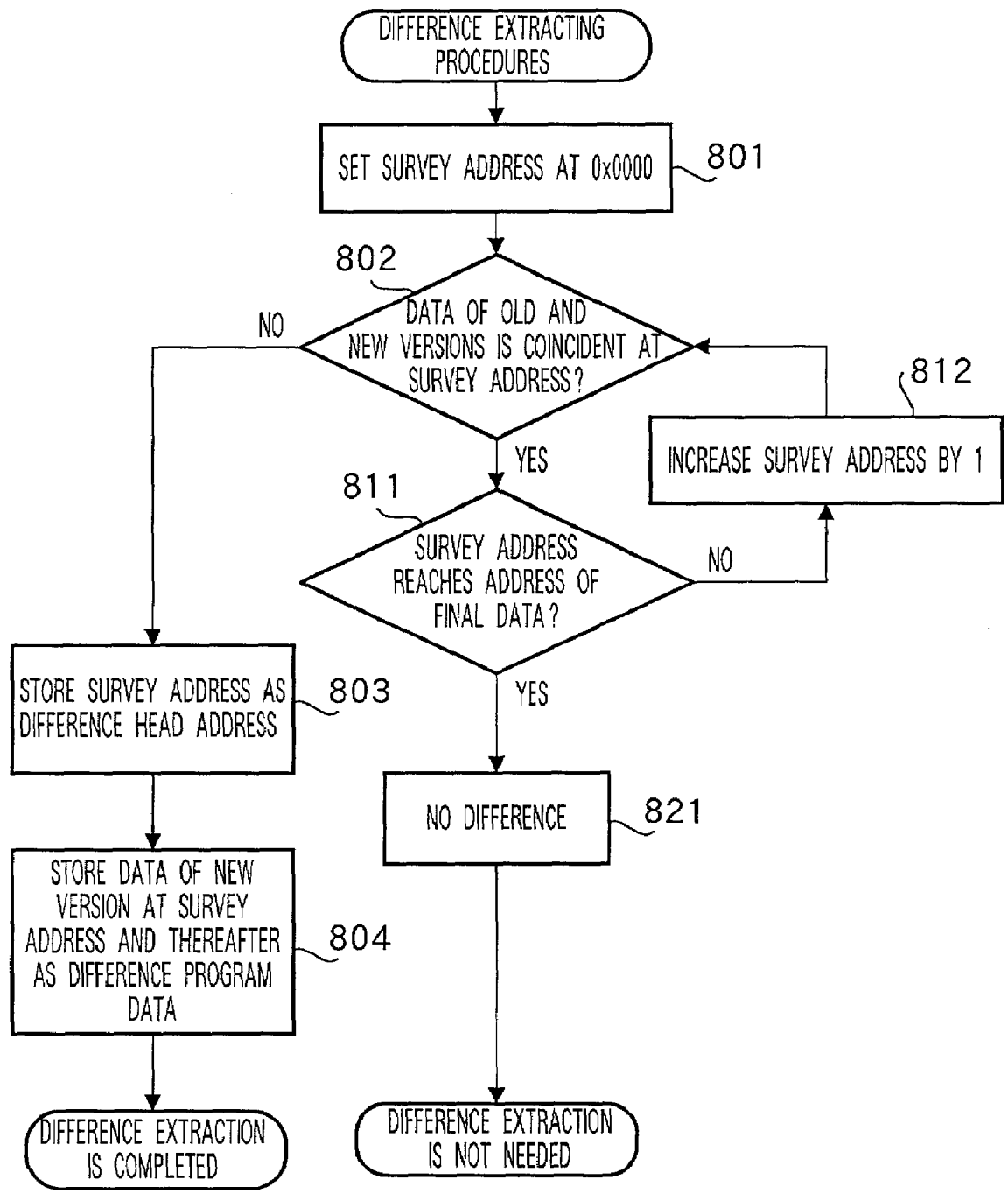
FIG. 8 is a flow diagram of procedures for extracting differences between the old and new versions of programs in the program difference extracting apparatus in the above embodiment.

The operation in program difference extracting apparatus 110 will be described below with reference to FIGS. 1, 6 and 8. FIG. 6 illustrates configurations of old and new versions of programs generated in program module configuring apparatus 100 and a configuration of difference data generated in program difference extracting apparatus 110. In this example, data differs from a latter portion of the graphic module. FIG. 8 is a flowchart of difference extracting section 112.

In step 801, a survey address is set at 0x0000 that is a head address of the program data.

In step 802, contents at the survey address are compared between old version of program 600 and new version of program 610. As a result of the comparison, when the contents are coincident, the processing flow proceeds to step 811, where the section 112 determines whether or not the survey address reaches a final one of the data.

In step 811, when the survey address reaches the final one of the data, the processing flow proceeds to step 821, and since there is no difference and difference extraction is not needed, the operation is completed.

In step 811, when the survey address does not reach the final one of the data, the processing flow proceeds to step 812, where the survey address is incremented by 1, and the flow returns to step 802.

In step 802, the processing of steps 802, 811 and 812 is repeated until a difference is indicated in a result of comparison between the contents at a survey address. In the example in FIG. 6, the processing of steps 802, 811 and 812 is repeated until the survey address becomes 0x8000.

In step 802, when a difference is indicated in a result of comparison between the contents at a survey address, the processing flow proceeds to step 803. In step 803, the survey address is stored as a difference head address.

In step 804, the section 112 extracts data at the survey address and thereafter of new version of program 610, and generates difference program data 650 composed of the extracted data to complete the difference extraction.

Thus, program difference extracting apparatus 110 extracts the difference from data of the two versions of programs generated in program module configuring apparatus 100, and it is thereby possible to generate data of small size for program update with less procedures as compared with conventional path generation.

In this embodiment, it is assumed, as an example, to generate, particularly with respect to versions that a plurality of terminal apparatuses 130, the difference data from the latest program data according to the aforementioned method.

This way enables center apparatus 120 that holds the latest program data generated in program module configuring apparatus 100 and the difference data generated in program difference extracting apparatus 110 to hold a most efficient number of items of program data and difference data as compared to a case of holding difference data for all the versions.

Figure 9:
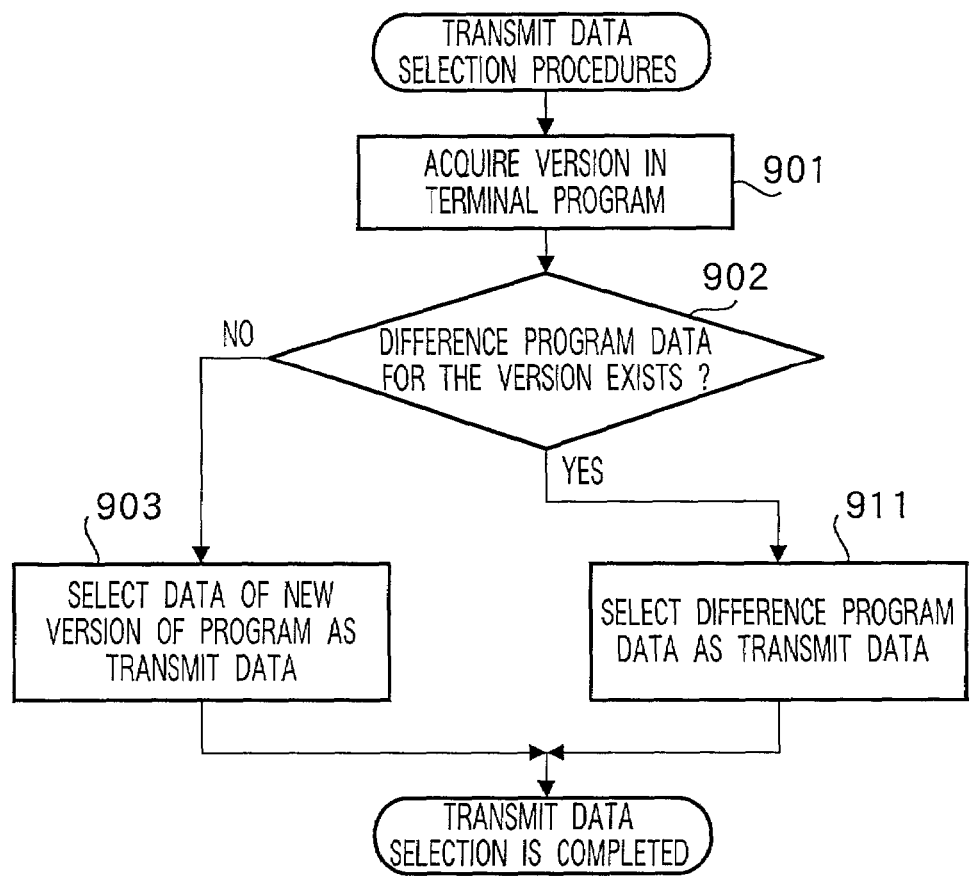
FIG. 9 is a flow diagram of procedures for selecting transmit data in the center apparatus in the above embodiment.
Figure 10:
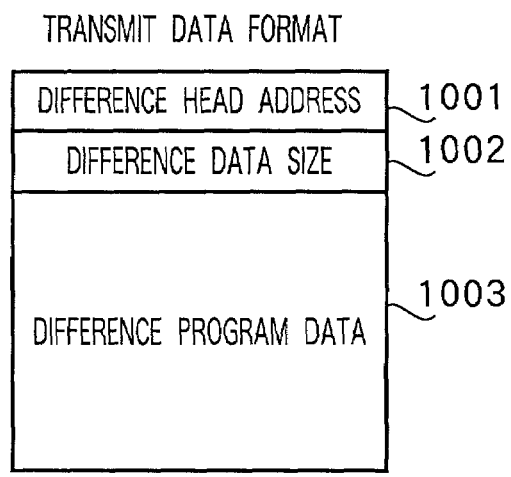
FIG. 10 is a diagram illustrating a format of transmit data in the center apparatus in the above embodiment.
Figure 11:
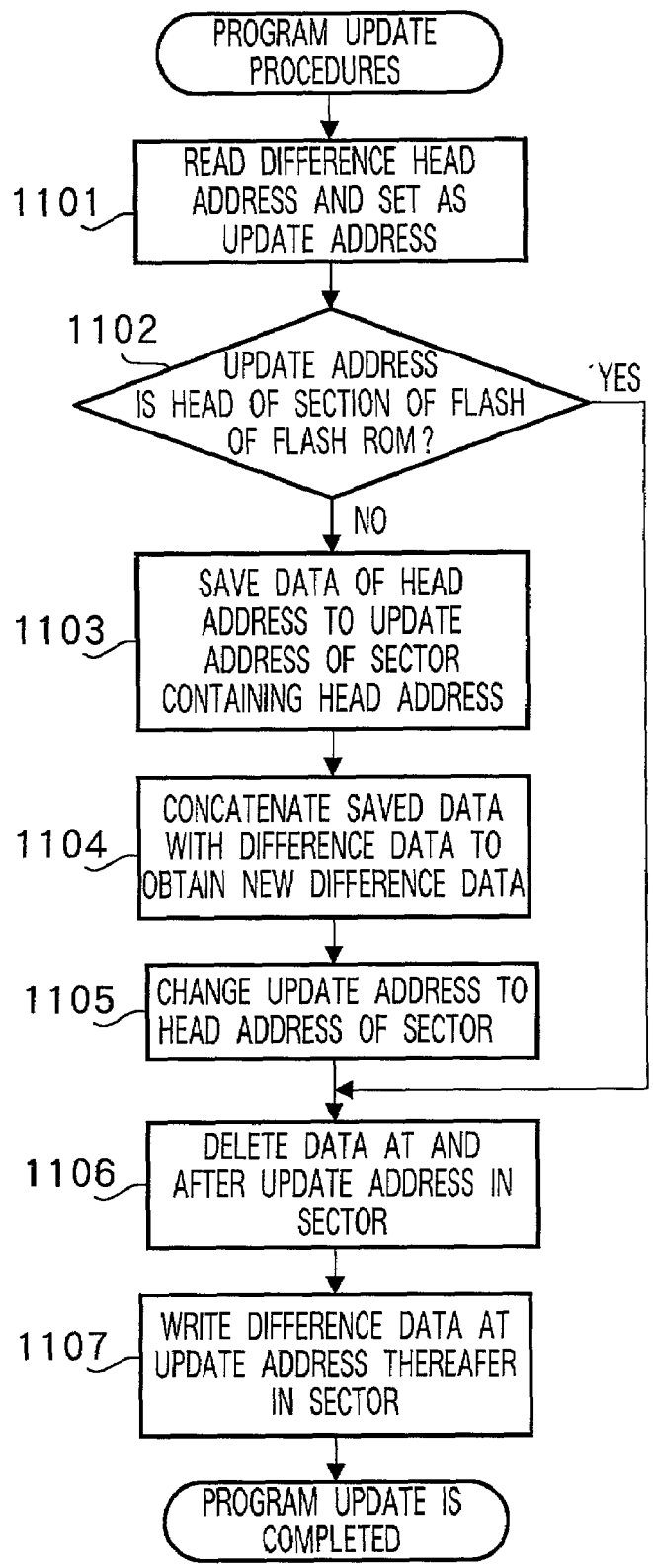
FIG. 11 is a flow diagram of procedures for updating a program in a terminal apparatus in the above embodiment.

The operation in terminal apparatus 130 and center apparatus 120 will be described below with reference to FIGS. 1, 7, 9 to 11. FIG. 7 is a table of managing information 700 on a plurality of items of data held in data holding section 121. FIG. 9 is a flowchart for selecting data in data selecting section 124. FIG. 10 is a format of data transmitted from data transmitting section 125. FIG. 11 is a flowchart for updating a flash ROM in flash ROM updating section 135.

Center apparatus 120 executes the processing for updating a program when a newer version is issued than the version in terminal apparatus 130 under management of center apparatus 120. For example, it may be possible that terminal apparatus 130 notifies center apparatus 120 of the own version in order to update the program voluntarily (according to user designation, periodically or the like), and that center apparatus 120 receiving the notification determines whether or not the downloading is required. In this case, as a response from center apparatus 120, it may be possible to update the program automatically, or to notify only the presence or absence of the difference data.

In the case of updating a program, in step 901, in center apparatus 120 version acquiring section 123 inquires about version information to terminal apparatus 130 via communication section 122. In response to this inquire, in terminal apparatus 130 version notifying section 133 replies to notify a version in terminal program. By this reply, version acquiring section 123 acquires the version in terminal program.

In step 902, data selecting section 124 compares the version of a source of difference data in data managing information 700 in data holding section 121 with the version information in terminal program acquired in step 901, and determines whether or not difference program data exists.

When the difference program data exists, the processing flow proceeds to step 911, and the section 124 selects the difference program data as transmit data. In the example in FIG. 7, when the version in the terminal is V2.0, the flow proceeds to step 911, and the section 124 selects difference program data 701 that is difference data between the latest version and V2.0 as the transmit data.

In step 902, when the difference program data does not exist, the processing flow proceeds to step 903, and the section 124 selects whole data 702 of the new version of program as the transmit data.

Next in center apparatus 120, data transmitting section 125 transmits the program data for updating the program to terminal apparatus 130. FIG. 10 illustrates an example of data format communicated between data transmitting section 125 in center apparatus 120 and data acquiring section 134 in terminal apparatus 130. As illustrated in FIG. 10, the data format is composed of difference head address 1001, difference data size 1002 and difference program data 1003.

In terminal apparatus 130, when data acquiring section 134 receives the data, flash ROM updating section 135 updates contents of the flash ROM according to the flowchart in FIG. 11.

First in step 1101, flash ROM updating section 135 sets difference head address 1001 as an update address.

Next in step 1102, the section 135 determines whether or not the update address designates the head of a sector of flash ROM 131.

When the update address designates the head of a sector of flash ROM 131, the proceeding flow proceeds to step 1106. Meanwhile, when the update address is not of the head of a sector of flash ROM 131, the flow proceeds to step 1103, and the section 135 saves data of the head address to an address immediately before the update address in the sector containing the update address.

In step 1104, section 125 concatenates the data saved in step 1103 with difference data 1003 to obtain new difference program data.

In step 1105, the head address of the sector containing the update address is newly set as an update address.

In step 1106, the section 125 deletes data of sectors of the update address and thereafter, and in step 1107, writes the difference program data in sectors of the update address and thereafter to complete the update of flash ROM 131.

According to this embodiment, with respect to a plurality of terminal apparatuses that have various versions of programs, difference data is transmitted to each terminal having a version of program that a large number of terminal apparatuses 130 have, and the whole data of the latest version of program is transmitted to terminals having versions except such a version (or versions). It is thereby possible to decrease the size of update data to be held on the center side as compared to the case of holding all the difference data for various versions of programs, and to shorten a time of communications between center apparatus 120 and all the terminal apparatuses 130 as compared to the case of transmitting the whole data of the latest version of program to all the terminal apparatuses 130.

Further, by providing commonality in update procedures in the terminal apparatus between the case of receiving the difference data and the case of receiving the whole data of program, it is possible to execute the update of terminal program with less procedures.

In addition, in program module configuring apparatus 100, each functional block, i.e., each of module input section 101, module configuring section 102, configuring order designating section 103 and program outputting section 104 is capable of being achieved by a dedicated circuit such as DSP, or it may be possible to achieve the function equivalent to each functional block by CPU executing the program. In particular, it may be possible to compose program module configuring apparatus 100 by installing into a computer a program to execute the steps of designating a configuring order of software modules based on a relationship between the dependence of the software modules, and of configuring each of the software modules according to the designated configuring order, and by executing the program by CPU. The program may be stored in storage media to be distributed.

Further, in program difference extracting apparatus 110, each functional block, i.e., each of program input section 111, difference extracting section 112, and difference data outputting section 113 is capable of being achieved by a dedicated circuit such as DSP, or it may be possible to achieve the function equivalent to each functional block by CPU executing the program. In particular, it may be possible to compose program difference extracting apparatus 110 by installing into a computer a program to execute the steps of comparing program data of two versions, i.e., new one and old one, according to address, detecting, based on the comparison result, an address where contents first make a difference, and extracting program data at the detected address and thereafter from program data of new version as difference data, and by executing the program by CPU. The program may be stored in storage media to be distributed.

Furthermore, in center apparatus 120, each functional block, i.e., each of communication section 122, version acquiring section 123, and data selecting section 124 is capable of being achieved by a dedicated circuit such as DSP, or it may be possible to achieve the function equivalent to each functional block by CPU executing the program. In particular, it may be possible to compose center apparatus 120 by installing into a computer a program to execute the steps of acquiring version information of the program from terminal apparatus 130, selecting the difference data of the program when the acquired version information is coincident with a version in the program that is a source of the difference data held in data holding section 121, while selecting the latest version of program when the version information is not coincident with any version, and transmitting the selected difference data or the latest version of program to terminal apparatus 130, and by executing the program by CPU. The program may be stored in storage media to be distributed.

Still furthermore, in terminal apparatus 130, each functional block, i.e., each of communication section 132, version notifying section 133, data acquiring section 134, and ROM updating section 135 is capable of being achieved by a dedicated circuit such as DSP, or it may possible to achieve the function equivalent to each functional block by CPU executing the program. In particular, it may be possible to compose terminal apparatus 130 by installing into a computer a program to execute the step of using difference data obtained by extracting, from the latest program data, program data at an address, and thereafter, which causes a first difference in contents between the latest program data and the program data of a version stored in flash ROM 131 in comparing the data, updating portions at the address and thereafter of the program stored in flash ROM 131, and by executing the program by CPU. The program may be store in storage media to be distributed.

The present invention is not limited to the above described embodiments, and various variations and modifications may be possible without departing from the scope of the present invention.

This application is based on the Japanese Patent Application No.2001-098582 filed on Mar. 30, 2001, entire content of which is expressly incorporated by reference herein.

What is claimed is:

1. A centralized apparatus for downloading a program to a terminal apparatus, comprising:

a storage medium that holds a latest version of a program composed of a plurality of software modules, the storage medium also holding a difference program generated in an apparatus for generating the difference program and composed of difference data corresponding to a difference between an old version of the program and the latest version of the program;

a version acquirer that acquires, from the terminal apparatus, version information of the version of the program installed on the terminal apparatus;

a data selector that selects the difference program when the acquired version information coincides with the old version of the program used to generate the difference program held in the storage medium, and that selects the latest version of the program when the acquired version information does not coincide with any version of the program used to generate the difference program; and a data transmitter that transmits the selected difference program or the selected latest version of the program to the terminal apparatus, wherein, when the data selector selects the difference program, the data transmitter transmits, with the difference program, an address that causes a first difference in contents between the old version of the program and the latest version of the program in comparing the programs and, when the data selector selects the latest version of the program, the data transmitter transmits, with the latest version of the program, a head address of the latest version of the program.

2. A terminal apparatus for downloading a program from a centralized apparatus, comprising:

a storage medium that stores a version of the program;

a version notifying section that notifies the centralized apparatus of the version of the program stored in the storage medium;

a receiving section that receives a latest version of the program, or that receives a difference program, composed of difference data corresponding to a difference between an old version of the program and the latest version of the program, from the centralized apparatus after notifying the centralized apparatus of the version of the program stored in the storage medium; and an update section that writes the received difference program or the latest version of the program over the version of the program stored in the storage medium from an update starting position, the update starting position indicating an address that causes a first difference in contents between the version of the program stored in the storage medium and the latest version of the program in comparing the version of the program stored in the storage medium and the latest version of the program, wherein the storage medium is composed of a flash ROM, and when the update starting position is within a sector of the flash ROM, the update section adds a part of the program, from a head address of the sector to the update starting position, to the head of the difference program to generate an added difference program, and writes the added difference program over the sector starting from the head address of the sector.

3. The terminal apparatus according to claim 2, wherein said terminal apparatus receives the address indicating the update starting position with the latest version of the program or the difference program from the centralized apparatus.

4. A remote program downloading system for downloading a program from a centralized apparatus to a terminal apparatus, wherein the centralized apparatus comprises:

a first storage medium that holds a latest version of a program composed of a plurality of software modules, the first storage medium also holding a difference program generated in an apparatus for generating the difference program and composed of difference data corresponding to a difference between an old version of the program and the latest version of the program;

a version acquirer that acquires, from the terminal apparatus, version information of the version of the program installed on the terminal apparatus;

a data selector that selects the difference program when the acquired version information coincides with the old version of the program used to generate the difference program held in the first storage medium, and that selects the latest version of the program when the acquired version information does not coincide with any version of the program used to generate the difference program; and a data transmitter that transmits the selected difference program or the latest version of the program to the terminal apparatus, wherein, when the data selector selects the difference program, the data transmitter transmits, with the difference program, an address that causes a first difference in contents between the old version of the program and the latest version of the program in comparing the programs and, when the data selector selects the latest version of the program, the data transmitter transmits, with the latest version of the program, a head address of the latest version of the program, and wherein the terminal apparatus comprises:

a second storage medium that stores a version of the program;

a version notifying section that notifies the centralized apparatus of the version of the program stored in the second storage medium;

a receiving section that receives a latest version of the program or a difference program, composed of difference data corresponding to a difference between an old version of the program and the latest version of the program, from the centralized apparatus after notifying the centralized apparatus of the version of the program stored in the second storage medium; and an update section that writes the received difference program or the latest version of the program over the version of the program stored in the second storage medium from an update staffing position, the update starting position indicating an address that causes a first difference in contents between the version of the program stored in the second storage medium and the latest version of the program in comparing the version of the program stored in the second storage medium and the latest version of the program, wherein the second storage medium is composed of a flash ROM, and when the update starting position is within a sector of the flash ROM, the update section adds a part of the program, from a head address of the sector to the update starting position, to the head of the difference program to generate an added difference program, and writes the added difference program over the sector starting from the head address of the sector.

5. A storage medium for storing a program to make a computer execute the procedures of:

storing a latest version of a program composed of a plurality of software modules, and a difference program generated in an apparatus for generating the difference program and composed of difference data corresponding to a difference between an old version of the program and the latest version of the program;

acquiring, from the terminal apparatus, version information of the version of the program installed on the terminal apparatus;

selecting the difference program when the acquired version information coincides with the old version of the program used to generate the difference program, and selecting the latest version of the program when the acquired version information does not coincide with any version of the program used to generate the difference program; and transmitting the selected difference program or the selected latest version of the program to the terminal apparatus, wherein, when the difference program is selected, the difference program is transmitted with an address that causes a first difference in contents between the old version of the program and the latest version of the program in comparing the programs and, when the latest version of the program is selected, the latest version of the program is transmitted with a head address of the latest version of the program.

6. A remote program downloading method, comprising:

storing in a storage medium a latest version of a program composed of a plurality of software modules, and also storing in the storage medium a difference program generated in an apparatus for generating the difference program and composed of difference data corresponding to a difference between an old version of the program and the latest version of the program;

acquiring, from the terminal apparatus, version information of the version of the program installed on the terminal apparatus;

selecting the difference program when the acquired version information coincides with the old version of the program used to generate the difference program, and selecting the latest version of the program when the acquired version information does not coincide with any version of the program used to generate the difference program; and transmitting the selected difference program or the selected latest version of the program to the terminal apparatus, wherein, when the difference program is selected, the difference program is transmitted with an address that causes a first difference in contents between the old version of the program and the latest version of the program in comparing the programs and, when the latest version of the program is selected, the latest version of the program is transmitted with a head address of the latest version of the program.

* * * * *